United States Patent [19]

Kuze

[11] 4,456,967

[45] Jun. 26, 1984

[54] WRITE-ONLY SEQUENCE CONTROLLER

[76] Inventor: Yoshikazu Kuze, 31-3, Higashimagome 1-chome, Ohta-ku, Tokyo, Japan

[21] Appl. No.: 286,480

[22] Filed: Jul. 24, 1981

[30] Foreign Application Priority Data

Jul. 26, 1980 [JP] Japan .............................. 55-101874

[51] Int. Cl.³ .............................................. G06F 13/00
[52] U.S. Cl. ...................................... 364/900; 377/52
[58] Field of Search ............... 364/900 MS File, 140, 364/143, 191, 193, 144; 377/2, 20, 52, 55

[56] References Cited

U.S. PATENT DOCUMENTS

| | | | |
|---|---|---|---|
| 3,564,282 | 2/1971 | Vogelsberg | 377/46 X |
| 4,021,783 | 5/1977 | Highberger | 364/900 |
| 4,244,032 | 1/1981 | Oliver | 364/900 |
| 4,284,955 | 8/1981 | Beno | 377/52 X |

FOREIGN PATENT DOCUMENTS

WO80/00756 4/1980 PCT Int'l Appl.
2056121 3/1981 United Kingdom.

*Primary Examiner*—Edward J. Wise
*Attorney, Agent, or Firm*—John T. Roberts

[57] ABSTRACT

A write-only sequence controller in which data regarding the period of time in one cycle is divided into data "1" and data "0" which are designated by the number of the clock pulse. To this end, the system is provided with ten key switches for converting the data "1" and data "0" into the number of the clock pulse and an encoder for converting the number of the clock pulse into BCD codes. The BCD codes are set in presettable counter which counts the clock pulse from a clock pulse generating circuit through gate circuits. The system is further provided with a binary counter for counting the clock pulse applied to the presettable counter, memory RAMs connected to address lines of the binary counter for memorizing data from the counter, and an EPROM for memorizing data stored in the memory RAMs. When the number of the clock pulse applied to the presettable counter and to the binary counter reaches the preset number, the gate circuits are closed. By operating a set switch, data stored in the memory RAMs are programed to the EPROM.

7 Claims, 10 Drawing Figures

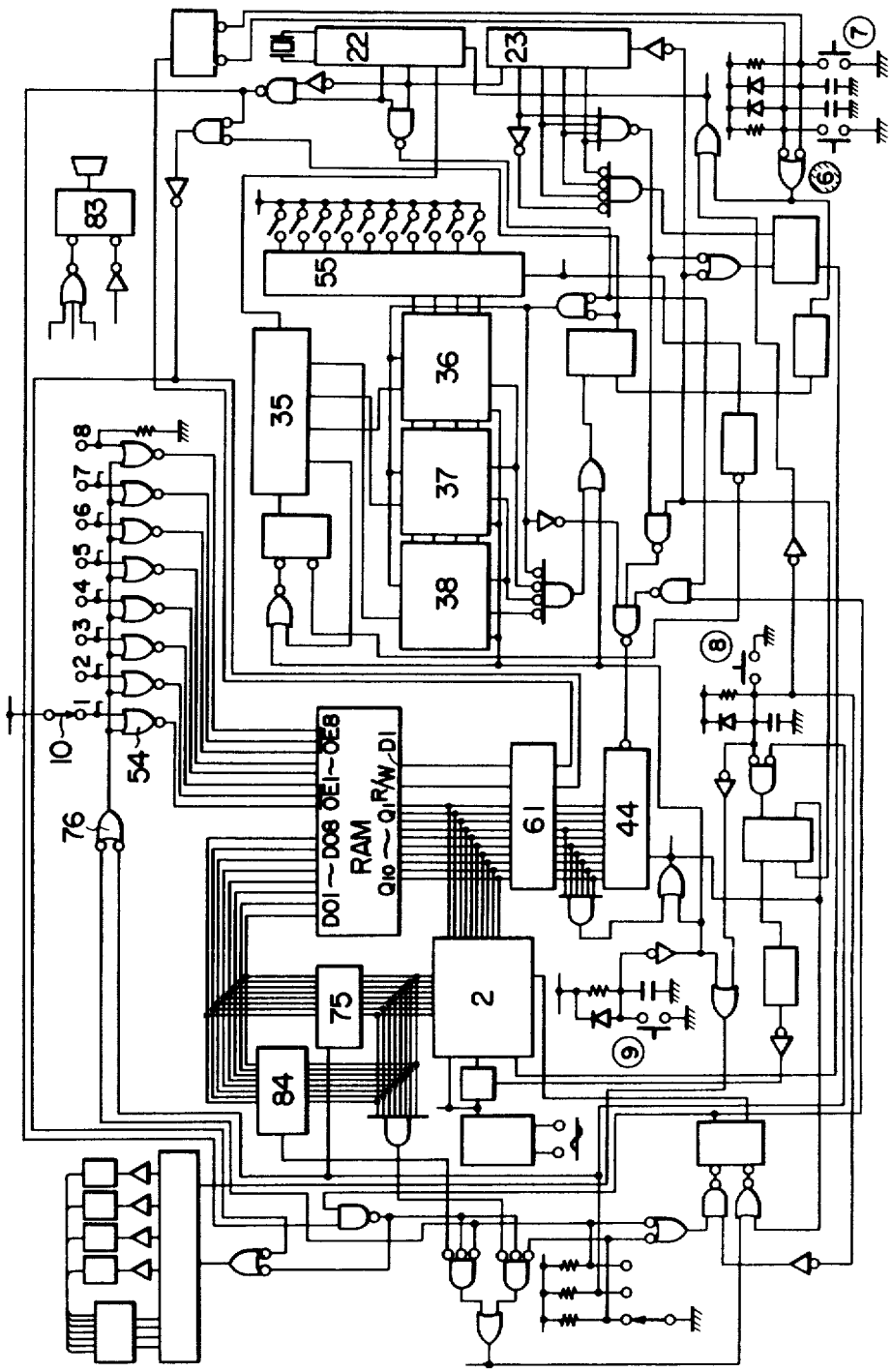

WRITE-ONLY SEQUENCE CONTROLLER

BACKGROUND OF THE INVENTION

The present invention relates to a sequence controller, and more particularly to a write-only sequence controller of a stored program type with which data programing and its modification can be done extremely easily and rapidly.

A conventional sequence controller has a writing means and a reading means. However, the writing means is not used after a necessary data has been written in. Therefore the sequence controller having both writing means and reading means is very expensive. In order to remove such disadvantages, a sequence controller having a single function should be provided. Moreover, in order to carry out the programing and changing thereof, skilled programmers are required. Therefore, in case that there is no proper person to meet such purposes, the programing is often made by third person, which will result in the leakage of user's original technical know-how to the outside.

If such a sequence controller is divided into a write-only sequence controller and a read-only sequence controller, and if the write-only sequence controller is detachably provided with a read-only memory EPROM and the read-only sequence controller is adapted to be operated by attaching the EPROM to produce an output of data in the EPROM, data may be written in a plurality of EPROMs by one write-only sequence controller. Therefore, an economical control system is provided.

SUMMARY OF THE INVENTION

It is an object of the present invention to provide a write-only sequence controller in which data programings and modifications may be easily and quickly carried out by anyone having no special technical knowledge, and which is compact and inexpensive.

It is assumed that the system of the present invention employs one memory RAM of 8K bits, and parallel eight memory RAMs of 1K bit. In an embodiment of the present invention, data per period of time to be described on a time chart are divided into "1" data and "0" data which is residual period. The "1" data and "0" data in one cycle are converted to corresponding numbers of the clock pulse, respectively. By depressing ten-key switches, 37 1" data and "0" data are written into the RAM. Then data in the RAM is programmed in the EPROM by operating a mode select switch and set switch in a short time.

According to the present invention, there is provided a a write-only sequence controller in which data in one cycle are divided into data "1" and data "0", comprising a clock pulse generating circuit, ten-key switches for converting said data "138 and data "038 in one cycle into the number of the clock pulse in one cycle respectively, an encoder for converting said number of the clock pulse in one cycle into the BCD code, presettable counters connected to said encoder, circuit means for presetting said presettable counters and for shifting said BCD code, a data "1" switch for said data "1" and a data "0" switch for said data "0", write clock pulse control gate means connected between said clock pulse generating circuit and said presettable counters and responsive to a signal from said data "1" switch and data "0" switch for controlling said clock pulse applied to said presettable counters, R/W pulse control gate means connected to said clock pulse generating circuit and responsive to a signal from said data "1" switch and data "0" switch for producing R/W pulses for reading and writing of data, a binary counter for counting said clock pulse fed to said presettable counters, memory RAMs connected to address lines of said binary counter for memorizing data therefrom in accordance with said R/W pulses, an EPROM for memorizing data stored in said memory RAMs, and read clock pulse control gate means connected to said clock pulse generating circuit for applying pulses to said EPROM for programming data in said RAMs to said EPROM.

BRIEF DESCRIPTION OF THE DRAWINGS

FIG. 8 shows a second embodiment of the present invention using the memory RAM shown in FIG. 7;

DESCRIPTION OF THE PREFERRED EMBODIMENTS

Figure 1:
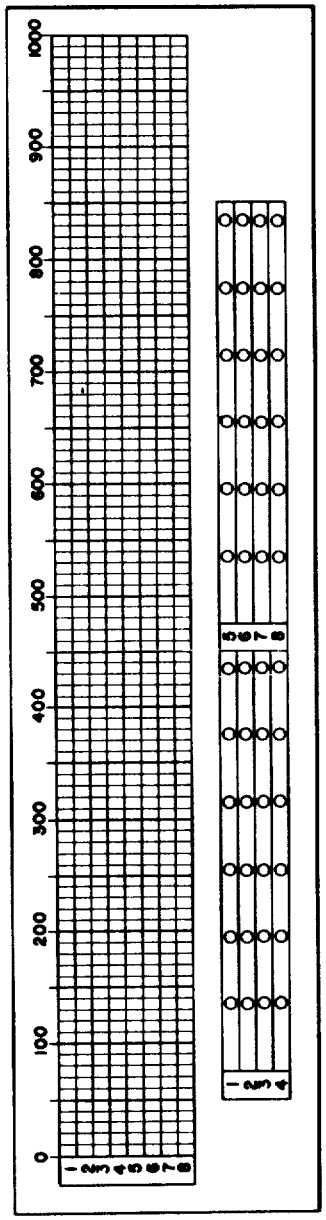
FIG. 1 shows a memory sheet for a write-only sequence controller according to the present invention.

Referring to FIG. 1 showing a memory sheet for sequence time chart, numerals 0 to 1000 of the upper column indicate the number of timing marks in one cycle, while the numerals 1 to 8 arranged vertically along the left-hand edge depict the eight parallel processes or cycles.

Figure 2:
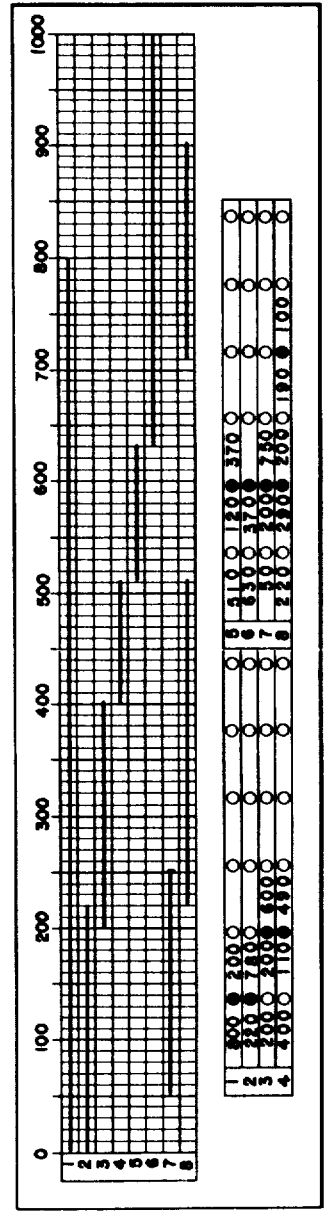
FIG. 2 shows an example of the time chart written in the memory sheet of FIG. 1.

FIG. 2 shows a time chart prepared in the upper column and in the lower column. The lined section in the upper column indicates data "1" (black) and the blank section indicates data "0" (white). The time chart for the eight parallel processes is digitally indicated by the numbers of black and white in the lower column. That is, the first cycle is indicated as 800 black circles and 200 white circles. The second cycle is indicated 220 black circles and 780 white circles.

Figure 3:
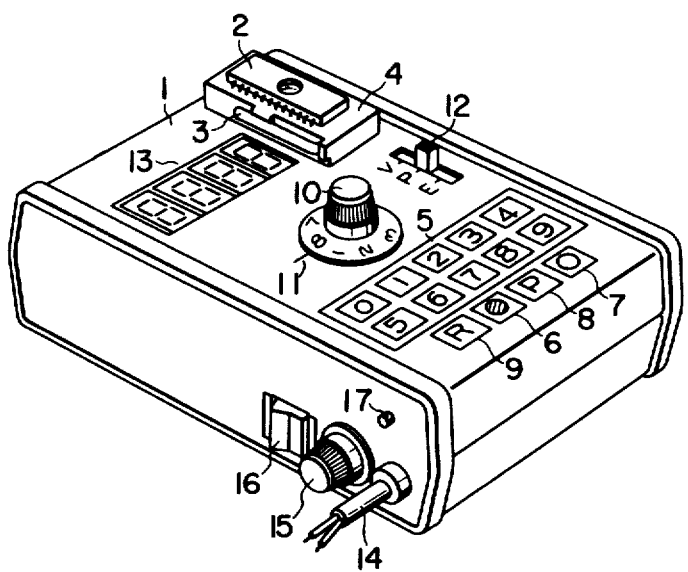
FIG. 3 shows a perspective view of the write-only sequence controller.
Figure 4:
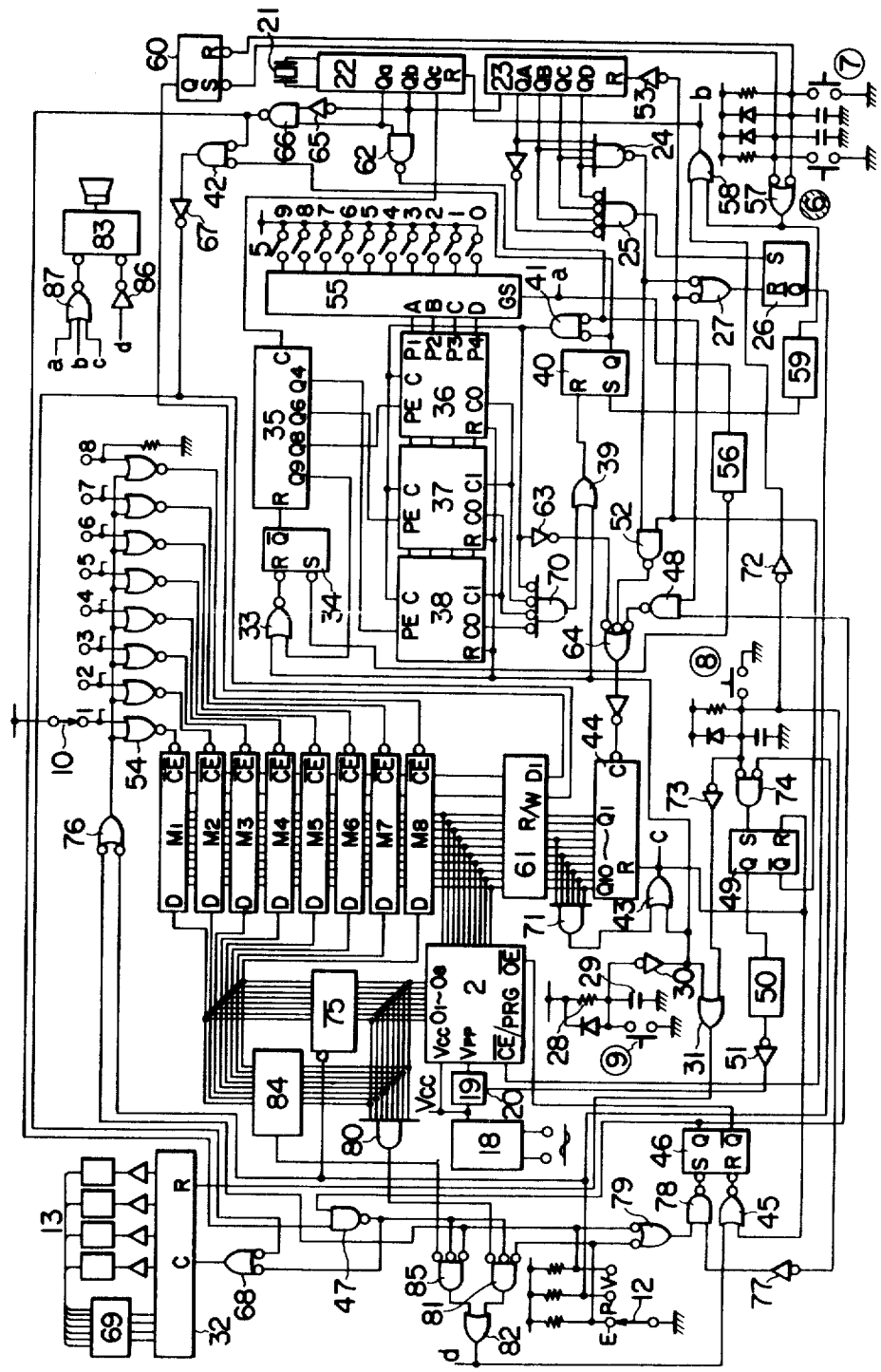
FIG. 4 shows a circuit of the present invention using an EPROM operated by a single power supply source.

Referring to FIG. 3, numeral 1 designates a case of the sequence controller according to the present invention. An EPROM 2 is secured to a connector 4 by a lock lever 3. Numeral 5 is a ten-key switch, 6 is a data "1" switch, 7 is a data "0" switch, 8 is a set swich, and 9 is a reset switch. A process select switch 10 is to select memories M1, M2 . . . M8. One of the memories is selected by setting one of numbers 1, 2 . . . 8 on the dial to an index 11. A mode select switch 12 selects a write-in mode at E position, a program mode of the EPROM at P position and a verify mode of the EPROM at V position. Usually, the mode select switch 12 is set to E position. An indicator 13 displays clock number of 1000 which is the total of data "1" and data "0" at every one cycle end, whereby misoperation on the ten-key switch may be checked. Numeral 14 designates a supply card, 15 is a fuse, 16 is a power switch and 17 is a pilot lamp Referring to FIG. 4, a system supply voltage $V_{CC}$ (+15 V) is obtained by an AC/DC converter 18 and a supply voltage +25 V applied to a $V_{pp}$ of the EPROM 2 is obtained by a DC/DC converter 19 by setting up the $V_{CC}$. When an input 20 of the DC/DC converter 19 is at "1", +25 V is supplied to the $V_{pp}$ terminal, and when the input 19 is at "0", the supply is stopped.

In the EPROM 2, an N-bit program pulse is added at every addressing and the program is completed upon one loop. At that time, the width of the program pulse added to a terminal $\overline{CE}$/PRG is about 50 ms per one address. Frequency of a crystal oscillator 21 is selected so as to obtain the program pulse of 50 ms. The frequency is divided by a first frequency divider 22 for write clock pulses and a second frequency divider 23 for read clock pulses so that the frequency of an output QA is decided.

Divider outputs QA, QB, QC and QD are applied to a 4-input NAND gate 24 and outputs $\overline{QA}$, QB, QC and QD are applied to a 4-input NOR gate 25. When divider outputs $\overline{QA}$, QB, QC and QD are 1,0,0,0, the gate 25 produces an output "1"for setting a flip-flop 26 to produce an output "1" from $\overline{Q}$. The output $\overline{Q}$ continues to produce the output "1" until outputs QA, QB, QC and QD are changed to 1,1,1,1 and an output "0" generated from the gate 24 resets the flip-flop 26 through a 2-input NAND gate 27. Thus, the program pulse of 50 ms is applied to the $\overline{CE}$/PRG terminal of the EPROM.

When the power switch 16 is turned on, a differentiation pulse "1" is generated from an integrating circuit comprising a resistor 28 and a capacitor 29 through a Schmitt 30. The differentiation pulse "1" resets all of circuits as will be described hereinafter.

The differentiation pulse "1" is applied to a reset R of a decade counter 32 through a 2-input OR gate 31 to clear it. On the other hand, a flip-flop 34 is reset by the differentiation pulse "1" through a 2-input NOR gate 33 and a "1" is applied to a reset R of a ring counter 35 to clear it. Further, the differentiation pulse "1" is applied to resets Rs of presettable counters 36, 37 and 38 to clear them. Further, a flip-flop 40 is reset through a 2-input OR gate 39, whereby a write clock pulse control 2-input NOR gate 41 and an R/W pulse control gate 42 are closed. A flip-flop 49 is reset through a gate 43, so that a "0" is applied to the DC/DC converter 19 through a delay circuit 50 and an inverter 51 to stop the supply of +25 V to the EPROM 2 and that a "1" from $\overline{Q}$ is applied to a read clock pulse control gate 52 to clear it. The "1" is also applied to a reset R of the second frequency divider 23 through an inverter 53 to clear it. Thus, all of divider outputs are stopped.

Writing of data is carried out with reference to the data sheet shown in FIG. 2. First, the process select switch 10 is operated to select the RAM M1 corresponding to the first process. Accordingly, an output "0" from a 2-input NOR gate 54 is applied to $\overline{CE}$ of the memory M1 to change it to an enable state.

Then, the key "8" of the ten-key switch 5 is depressed for 800 data "1" in the first process. A 4-bit binary code 1000 corresponding to the number "8" is received at P1, P2, P3 and P4 of the presettable counter 36 from an encoder 55. The encoder 55 further produces an output "1" from a group select GS, which is applied to a one-shot pulse generating circuit 56 to produce a differentiation pulse "0". The differentiation pulse "0" sets the flip-flop 34, so that the reset R of the ring counter 35 is changed into a "0". Accordingly, a clock pulse from a QC of the first frequency divider 22 is applied to the clock line C of the ring counter 35.

When the clock pulse is fed to the ring counter, one of flip-flops in the ring counter produces an output "1" and other flip-flops produce outputs "0". The output "1" is transfered in order of Q4, Q6, Q8 and Q9 such as a shift register.

Outputs Q4, Q6 and Q8 of the ring counter 35 are connected to corresponding preset enables PE of presettable counters 38, 37 and 36. Therefore, when the output Q8 is at "1", the BCD code of 1000 is preset in the presettable counter 36. When the output Q9 is at "1", the flip-flop 34 is reset to stop the circulating operation of the ring counter 35.

By depressing the key "0" of the ten-key switch twice, the binary code of 800 is preset corresponding presettable counters 38, 37 and 36. When the data "1" switch 6 is depressed, the output of a 2-input NAND gate 57 goes to a "1" which stops the output of the first frequency divider 22 through a 2-input OR gate 58, while the flip-flop 40 is set through a delay circuit 59. Further gate 41 and 42 are opened, a flip-flop 60 is set so that a "1" is applied to the DI of the memory M1 through a buffer 61.

When the switch 6 is released, the first frequency divider 22 starts to generate output pulses. Write clock pulses are generated from a gate 62. Passing through the gate 41, write clock pulses, on the one hand, are applied to clock lines C of the presettable counters 36, 37 and 38, and on the other hand, write clock pulses are applied to a clock line C of the binary counter 44 through an inverter 63 and a 3-input NAND gate 64.

Figure 5:
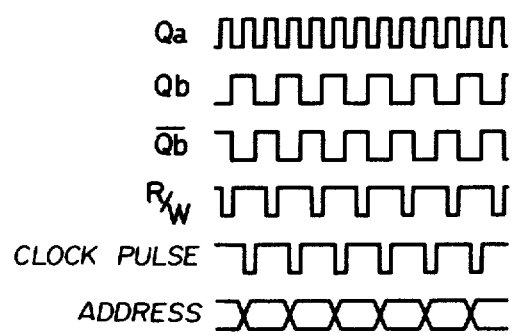
FIG. 5 and FIG. 6 show timing diagrams.

R/W pulses generated from the first frequency divider 22 through an inverter 65 and 2-input NAND gate 66 are in advance of the write clock pulses as shown in FIG. 5. The R/W pulses are applied to an R/W line of the memory M1 through the gate 42, inverter 67 and buffer 61.

Address lines Q1, and Q2 . . . Q10 of a binary counter 44 are connected to corresponding address lines of the memory M1. Accordingly, 800 data "1" are written in address cells of memory M1 in accordance with R/W pulses.

The R/W pulses are also applied to clock lines of the decade counter 32 through the gate 42, inverter 67 and 2-input NAND gate 68 and the number of pulses is indicated in the display 13 through a decoder 69.

Each time one clock pulse is applied to the presettable counters 36, 37, 38, the content therein decreases by one. When the content in a lower figure counter reaches zero, the upper figure is counted down one and the number of lower figure changes from "0" to "9". When 800 clock pulses are applied to the presettable counters, inputs of a 4-input NOR gate 70 go to "0" by negative going clock input and an output "1" is produced. The "1" resets the flip-flop 40 through the gate 39 and closes gates 41 and 42, so that clock pulses are blocked at 800 and the indicator displays 800.

Next, the ten-key switch is depressed as 200. The binary code of 200 is preset in presettable counters 38, 37 and 36 through the encoder 55 and ring counter 35. Then, the data "0" switch 7 is depressed. The output "1" of the gate 57 stops the output of clock pulses, while the flip-flop 40 is set and gates 41 and 42 are opened. Further, the flip-flop 60 is reset and the DI of the memory M1 is changed to "0" through the buffer 61.

When the switch 7 is released, the generation of the first frequency divider is started, so that 200 data "0"

are written in the memory M1. Next, when 200 clock pulses are applied to the presettable counters, an output "1" from the gate 70 resets the flip-flop 40 and closes the gates 41 and 42 to block clock pulses, so that the indicator 13 displays 0001 cycle.

When inputs of 1000 data which are the total of 800 "1" data and 200 "0" data are applied to the binary counter 44, an output of a multi-input NAND gate 71 goes to a "1" to clear the binary counter. (The binary number of 1000 is 1111101000 so that inputs of the gate 71 are connected to address lines Q4, Q6, Q7, Q8, Q9 and Q10.)

If the ten-key switch 5 is correctly operated, the indicator 13 displays 1000 when the writing data for one cycle is over. If there is any error, the error is displayed on the indicator 13 as the number. In such a case, key operation is done again.

Here, writing data for the first cycle is over, the reset switch 9 is depressed to reset all of the circuits. Then, the second process is selected by the process select switch 10, so that the memory M2 is selected. Data for the second process are written in the same manner as the operation for the first process. Thus, data for all processes are written in the memories M1, M2 ... M8.

After the data is written in the RAM, the mode select switch 12 is set to P and the set switch 8 is depressed. The output from the first frequency divider 22 is stopped through the inverter 72 and gate 58, while the decade counter 32 is cleared through the inverter 73 and gate 31. Since P is connected to the ground, an input of a 2-input NOR gate 74 is at "0" and the flip-flop 49 is in the set state. An input "1" is applied to the input 20 of the DC/DC converter 19 through the delay circuit 50 and inverter 51, whereby +25 V is applied to $V_{pp}$ of the EPROM 2. Next, the read pulse control gate 52 is opened and a signal is applied to the second frequency divider 23 through the inverter 53 causing the output state. A "0" is applied to a 3-state buffer 75 to open the gate and a "1" is applied to eight gates 54 through a gate 76. Thus, all of memories M1, M2 ... M8 are selected to be in program mode.

Figure 6:
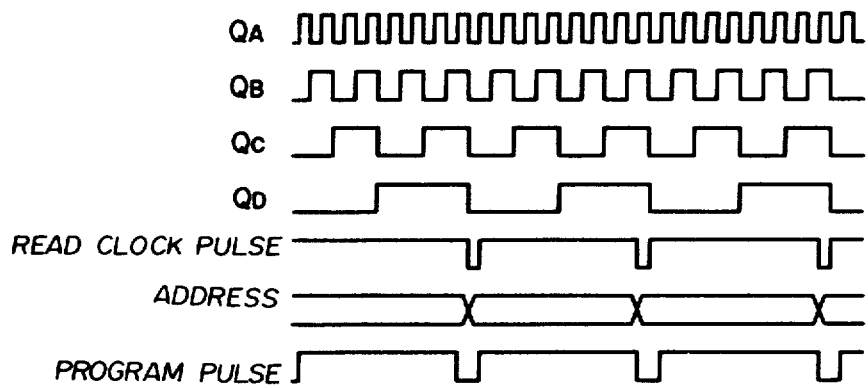

Then, the set switch 8 is released, read clock pulses are generated from the second frequency divider 23. As shown in FIG. 6, a read clock pulse is generated from the gate 24 at every eight counts of QA and the program pulse of 50 ms from the flip-flop 26 is applied to CE/PRG of the EPROM 2 in the synchronism with the read clock pulse. The read clock pulse generated from the gate 24 is applied to the binary counter 44 through gates 52 and 64 to address the address cells of the memories M1, M2 ... M8 and EPROM 2 corresponding to address lines of the binary counter 44. Data written in the RAM are applied from data output D by signal of the R/W "1" to the EPROM 2 through the 3-state buffer 75 to program at designated addresses.

When 1000 inputs of the read clock pulses are applied to the binary counter 44, the output "1" of the gate 71 clears the binary counter 44 through the gate 43 and resets the flip-flop 49 closing the read clock pulse control gate 52, and the output of the second frequency divider 23 is stopped. Thus, the programing to the EPROM is finished.

An abnormality checking circuit will be described hereinafter. Prior to the programing, it is necessary to confirm the fact that all bits of the EPROM are at "1". To this end, the mode select switch 12 is set to E and the set switch 8 is depressed. The generation of clock pulses from the first frequency divider 22 is stopped by a signal from the gate 58. An input "1" is applied to a gate 78 through an inverter 77. Since E is connected to the ground, a gate 79 produces an output "1". Accordingly, the output of the gate 78 goes to a "0" to set a flip-flop 46. The output Q "1" opens a second R/W control gate 47 and a second clock pulse control gate 48. The output $\overline{Q}$ "0" is applied to the $\overline{OE}$ of the EPROM 2 so that the EPROM 2 is rendered to be in output state and in erase check mode.

When the set switch 8 is released, the generation of the frequency divider 22 is started. The clock pulse enters in the binary counter 44 through the gates 62, 48 and 64 to address the addresses of the EPROM 2 corresponding to the address lines Q1–Q10 thereof. The data of all bits of the EPROM 2 are applied from data outputs 01–08 to a first input of a 3-input NOR gate 81 through a 8-input AND gate 80. On the other hand, the R/W pulse generated from the gate 66 is applied to a second input of the gate 81 through the gate 47. A third input of the gate 81 which is connected to the ground through E is a "0". When at least one of outputs of the EPROM 2 is "0", the output of the gate 80 goes to "0". All inputs of the gate 81 become to "0" on negative going of the R/W pulse so that the gate 81 produces an output "1". Accordingly, the flip-flop 46 is reset by a signal applied through a 2-input OR gate 82 and gate 45, closing gates 47 and 48. Also the output "1" is applied to the $\overline{OE}$ of the EPROM 2 to stop the generation of the output.

For the purpose of signalling, the GS line a of the encoder 55, output line b of the gate 58, and output line c of the gate 43 are connected to a gate 87, and the output line d of the gate 82 is connected to an inverter 86. Thus, a buzzer 83 produces an abnormality signal.

In order to check the completion of the programing to the EPROM 2, the mode select switch 12 set to V position and the set switch 8 is depressed. The output of the first frequency divider 22 is stopped. Since V is connected to the ground, all of memories M1-M8 are selected through the gates 76 and 54 and the 3-state buffer 75 is in high-impedance. Inputs of the gate 78 are at "1", the flip-flop 46 is in set state. Thus, the gates 47 and 48 are opened and the $\overline{OE}$ of the EPROM 2 is at a "0" to be in data output state and in verify mode.

When the set switch 8 is released, the generation of output of the first frequency divider 22 is started. The clock pulses are applied to the binary counter 44 through gates 62, 48 and 64 to address the addresses of the memories M1-M8 and EPROM 2 corresponding to the address line Q1–Q10 thereof. By the signal of the R/W "1", data of the memories M1-M8 and EPROM 2 are applied to a comparator 84 (or an exlusive OR gate). When both data are the same, the comparator produces an output "1", and when both data are different, an output "0" is produced. When the output of the comparator 84 is at "0", all inputs of a gate 85 are at "0" on negative going of the R/W pulse, so that the gate 85 produces an output "1". Accordingly, the flip-flop 46 is reset by a signal through the 2-input OR gate 82 and gate 45 and gates 47 and 48 are closed. Also the "1" is applied to the $\overline{OE}$ of the EPROM 2 to stop the output. At this time, the buzzer 83 produces an abnormality signal.

When a "1" is applied to the inverter 86, the buzzer 83 produces a long abnormality signal and when a "1" is applied to the gate 87, the buzzer 83 produces a short normal signal.

Figure 7:
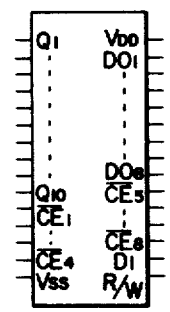
FIG. 7 shows a block diagram of a RAM.

FIG. 7 shows a block diagram of the memory RAM which is provided with eight parallel memories of 1024 words X 1 bit.

FIG. 8 shows a second embodiment of the present invention using the memory RAM shown in FIG. 7. Since the circuit is the same as FIG. 4, explanation of the operation is not made.

Figure 9:
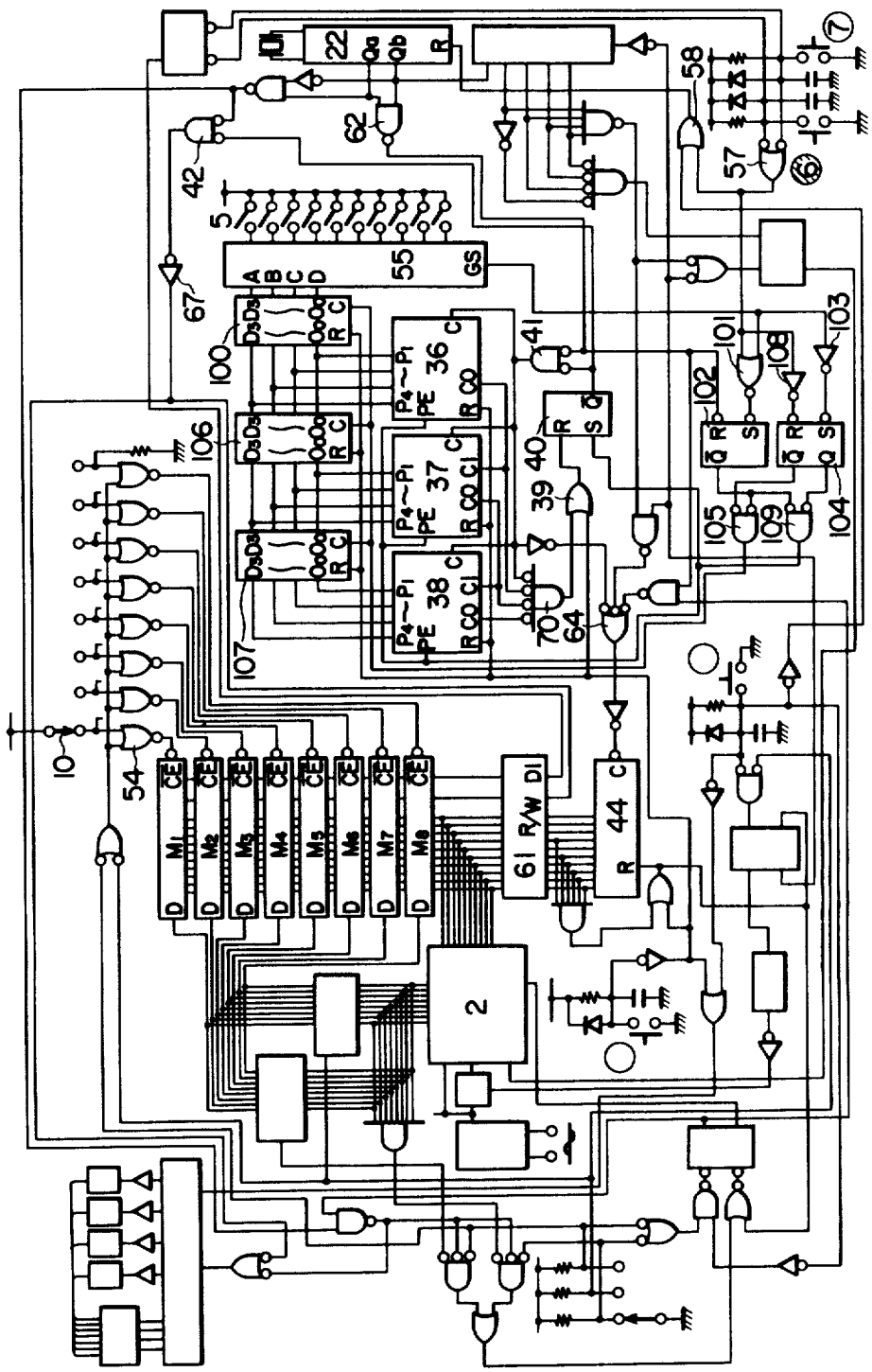
FIG. 9 shows a third embodiment of the present invention.

FIG. 9 shows a third embodiment of the present invention in which shift registers are employed in place of the ring counter 35 and frequency divider output is employed in place of the one-shot pulse generating circuit 56 for obtaining a differentiation pulse. This circuit produces a reliable one-shot pulse without influence of environment, because CR circuit is not used.

Writing of data is done with the data sheet shown in FIG. 2. By the cycle select switch 10, the RAM M1 corresponding to the first process is selected. When the key "8" of the ten-key switch 5 is depressed, the binary code 1000 of "8" appears at D0, D1, D2 and D3 of a shift register 100 through the encoder 55. At this time, an output "1" is generated from the GS of the encoder 55. The "1" sets a flip-flop 102 through a 2-input NOR gate 101 and a flip-flop 104 through an inverter 103, respectively. A 2-input NOR gate 105 produces an output "1". Since a reset terminal R of the flip-flop 102 is connected to a clock line, the flip-flop 102 is reset by negative going of the clock pulse to produce one differentiation pulse "1" from the gate 105. The differentiation pulse "1" is applied to clock lines of shift registers 100, 106 and 107 so that the binary code 1000 is shifted to the shift register 100. Thus, when "800" is depressed by the ten-key switch, the binary code 1000 corresponding to the key "8" is shifted to the shift register 107 and the binary code 0000 corresponding to the key "0" is shifted to the shift registers 106 and 100, respectively.

By depressing the data "1" switch 6, the output of the first frequency divider 22 is stopped by a signal from the gate 58, while the flip-flop 102 is set by a signal fed from the gate 101 and the flip-flop 104 is reset by a signal from an inverter 108. Thus, the output "1" is generated from a 2-input NOR gate 109. The "1" is applied to PEs of presettable counters 36, 37 and 38 so that corresponding presettable counters are preset to the contents of the shift registers. Also the output from the gate 109 sets the flip-flop 40 so that gates 41 and 42 are opened.

When the switch 6 is released, the generation of the first frequency divider is started. The flip-flop 102 is reset by negative going of the clock pulse so that the output of the gate 109 goes to a "0". 800 clock pulses enter in presettable counters, the output "1" from the gate 70 resets the flip-flop 40 and gates 41 and 42 are closed. Other structure and operation are the same as the first embodiment and the same parts thereof are identified with the same reference numerals as FIG. 4.

Figure 10:
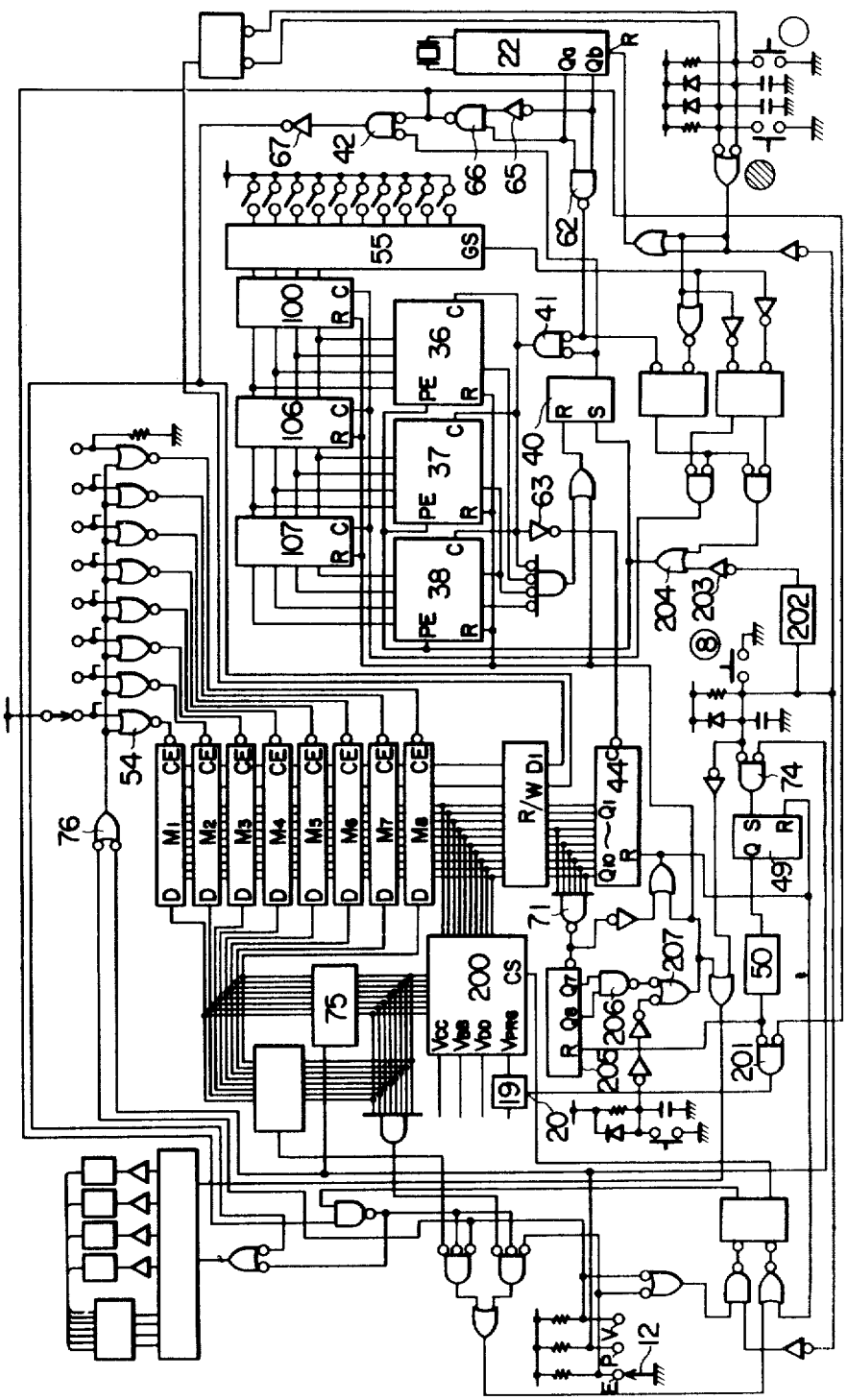
FIG. 10 shows a fourth embodiment of the present invention using an EPROM operated by three power supply sources.

Referring to FIG. 10, a system supply voltage $V_{CC}$ is obtained by an AC/DC converter and supply voltages $V_{BB}$ ($-5$ V), $V_{DD}$ ($+12$ V), $V_{PRG}$ ($+26$ V) applied to an EPROM 200 are obtained by a DC/DC converter. $V_{BB}$, $V_{DD}$ are directly connected to corresponding terminals of the EPROM, while a $V_{PRG}$ is applied to the $V_{PRG}$ of the EPROM through the controller 19.

When the input 20 of the controller 19 is at a "0", the program pulse to the EPROM is blocked and when the input 20 is at a "1", the program pulse is applied to the EPROM.

In the write-in mode, the flip-flop 49 is reset and a program pulse control gate 201 is closed by a signal from the delay circuit 50. A "0" is applied to the controller 19 to block $V_{PRG}$ to the EPROM 200. The write clock pulse is generated from the gate 62 inputs of which are Qa and Qb. The program pulse and R/W pulse are generated from the gate 66 inputs of which are Qa and Qb. From the gate 41, on the one hand, the write clock pulse is applied to the presettable counters and on the other hand, the write clock pulse is applied to the first binary counter 44 through the inverter 63. Data are written in the address of the memory RAM which is addressed by the binary counter on the signal of the R/W pulse. Then, when the data of 8K bits are written in RAMs, the mode select switch 12 is set to the P position and the set switch 8 is depressed. Since the P is connected to the ground, inputs of the gate 74 go to "0", so that the flip-flop 49 is set and the program pulse control gate 201 is opened by a signal through the delay circuit 50. The gate of the 3-state buffer 75 is opened and memories M1-M8 are selected by a signal through the gate 76. The flip-flop 40 is set by a signal fed by a delay circuit 202, an inverter 203, 2-input OR gate 204. The gates 41 and 42 are opened to be in program mode.

When the set switch 8 is released, the clock pulse is generated from the gate 62 and the R/W pulse and program pulse are generated from the gate 66. The clock pulse is applied to the first binary counter 44 to address the RAM and EPROM 200 corresponding to the address lines thereof. Then, the written data in the RAM is programed to the EPROM 200.

In order to program data in the EPROM 200, about 400 loops of program are required. When 1000 clock pulses are applied to the first binary counter 44, the output of the multi-input NAND gate 71 goes to a "0" so that a second binary counter 205 counts one. This is regarded as one loop. At this time, the first binary counter 44 is cleared and starts to count again the clock pulse. Thus, at every cycle end, the second binary counter 205 counts one. For example, in case of 384 loops, the binary number of 384 is 11000000. Accordingly, outputs Q7, Q8 of the binary counter 205 are connected to a 2-input NAND gate 206. When the second binary counter 205 counts 384 program loops, the output of the gate 206 goes to a "0". The output "0" of the gate 206 is applied to the flip-flop 49 through a gate 207 causing it to reset. Thus, the program pulse control gate is closed and the flip-flop 40, shift registers, presettable counters are reset.

From the foregoing it will be understood that the system of the present invention may be easily and quickly operated.

What is claimed is:

1. An EPROM programmer in which data in one cycle are divided into data "1" and data "0", comprising
   (a) a clock pulse generating circuit for generating clock pulses;
   (b) ten-key switches for inputting the number of data "1" and the number of data "0";
   (c) an encoder for converting said numbers data "1" and data "0" in one cycle into binary codes;
   (d) presettable counters connected to output terminals of said encoder;
   (e) a ring counter for presetting said binary code in said presettable counters and for shifting said binary code in dependency on said clock pulses;
   (f) a data "1" switch for said data "1" and a data "0" switch for said data "0";
   (g) write clock pulse control gate means connected between said clock pulse generating circuit and said presettable counters and responsive to signals from said data "1" switch data "0" switch for controlling said clock pulses applied to said presettable counters;

(h) R/W pulse control gate means connected to said clock pulse generating circuit and responsive to signals from said data "1" switch and data "0" switch for producing R/W pulses for reading and writing of data;

(i) a binary counter for counting said clock pulses fed to said presettable counters;

(j) memory RAMs connected to address lines of said binary counter for memorizing data therefrom in accordance with said R/W pulses;

(k) a detachably mounted EPROM connected through a connector with outputs of said RAMs for memorizing data stored in said memory RAMS;

(l) circuit means for applying signals to inputs of said counters and gate means for operating thereof.

2. The EPROM programmer according to claim 1 further comprising a mode select switch and a set switch; and mode selecting gate means responsive to signals from said mode select switch and said set switch for providing an erase check mode of said EPROM, a write-in mode for said RAMs, and a verify mode for said EPROM.

3. The EPROM programmer according to claim 1 further comprising a first flip-flop for controlling an R terminal of said ring counter, said flip-flop being adapted to be set by a signal from a group select terminal GS of said encoder and reset by an output of said ring counter.

4. The EPROM programmer according to claim 3 further comprising a second flip-flop adapted to be set by a signal from said data "1" switch for opening said write clock pulse control gate means and R/W pulse control gate means, and adapted to be reset by an output of said presettable counter, a third flip-flop adapted to be set by a signal from said data "1" switch for applying a "1" to data inputs of said memory RAMs.

5. The EPROM programmer according to claim 4 where in said second flip-flop is set by a signal from said data "0" switch for opening said write clock pulse control gate means and R/W pulse control gate means, and said third flip-flop is reset by a signal from said data "0" switch for applying a "0" to data inputs of said memory RAMs.

6. The EPROM programmer according to claim 1 wherein said write clock pulse control gate means comprises a first write clock pulse control gate, a second write clock pulse control gate, said read clock pulse control gate means comprises a read clock pulse control gate, said R/W pulse control gate means comprises a first control gate, said circuit means comprises a second flip-flop, a fourth flip-flop, and a fifth flip-flop, outputs of said first clock pulse control gate, said read clock pulse control gate and said second write clock pulse control gate being applied to said first gate, the output of said first gate being applied to the lock line of said binary counter, said first clock pulse control gate being controlled by said second flip-flop operated by outputs of said presettable counter, said read clock pulse control gate being controlled by said fourth flip-flop operated by a set switch, and said second write clock pulse control gate being controlled by said fifth flip-flop operated by said mode select switch.

7. The EPROM programmer according to claim 1 wherein said clock pulse generating circuit comprises a write clock pulse generating circuit and a read clock pulse generating circuit.

* * * * *